Patented Dec. 26, 1944

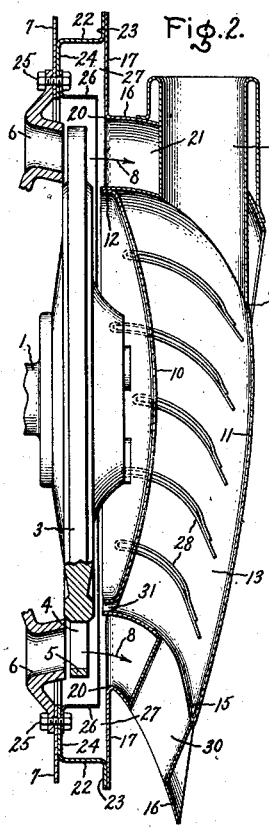

2,365,990

UNITED STATES PATENT OFFICE 2,365,990

AIRCRAFT TURBINE

Joseph S. Alford, Nahant, Mass., assignor to General Electric Company, a corporation of New York Application February 14, 1942, Serial No. 430,879

1 Claim. (Cl. 253—39)

The present invention relates to turbines and especially to gas turbines, such as, for example, gas turbines driven by exhaust gases from an internal combustion engine. An application of my invention is in connection with superchargers for aircraft and it is this application which I have elected to illustrate and describe. It is to be understood, however, that this is only by way of example and that my invention is not limited thereto.

The wheels of gas turbine driven superchargers operate at relatively high speeds and run at relatively high temperatures. Also, in general, superchargers are under control of the aircraft operator who may, under some circumstances, overspeed the same. Such overspeeding might, in some instances, cause loosening and flying off of a fragment of a turbine wheel, for example a piece of a shroud band, or a part of a turbine wheel bucket, which would then fly out by centrifugal force and in its flight might do damage to adjacent parts.

The object of my invention is to provide in connection with a turbine wheel means providing a trap for catching and retaining any fragment or fragments thrown off by a turbine wheel.

A gas turbine wheel forming a part of an aircraft supercharger is, in general, provided with a cooling and protecting cap for cooling the wheel and protecting it from hot gases issuing from the turbine wheel buckets, and a further object of my invention is to provide a trap which is built as a part of a cooling cap and serves, at least in part, as a mounting means for a cooling cap.

For a consideration of what I believe to be novel and my invention, attention is directed to the following specification and the claim appended thereto.

In the drawing, Fig. 1 is a face view of a structure embodying my invention; Fig. 2 is a vertical sectional view thereof, and Fig. 3 is a top plan view partly in section.

Referring to the drawing, 1 indicates the shaft of a supercharger which is carried in a suitable bearing, not shown, and has overhung on its end a turbine wheel comprising a central disk 3 on the periphery of which is a ring of buckets 4 having at their outer ends a shroud band 5. Gases from the engine or from other source of supply are directed against the buckets by nozzles 6 which form a part of a nozzle box 7. The exhaust gases are supplied to the nozzle box through a suitable conduit (not shown) connected with a source of supply such as, for example, the exhaust manifold of an internal combustion engine. Only sufficient of the supercharger has been illustrated as is required for an understanding of my invention. It is to be taken as typical of any suitable gas driven turbine construction.

The gas is discharged from the turbine wheel in the direction indicated by arrows 8 in Fig. 2. The direction of the slip stream is indicated by the arrow 9 in Fig. 2.

Located in front of the turbine wheel is a cooling cap or flighthood comprising two dished disk-shaped walls 10 and 11 joined along their edges as is indicated at 12 and spaced apart sufficiently to define a cooling air chamber 13 of the desired size. Inner wall 10 is of a diameter equal substantially to that of the turbine wheel disk 3. Outer wall 11 is curved downward at its upper or upstream portion as is indicated at 14 and depends downward somewhat beyond wall 10 as is indicated at 15. It provides a smoothly curved surface over which gases discharged from the upstream or top side of the turbine may flow. Surrounding walls 10 and 11 in spaced relation thereto is a downwardly curved annular wall 16 provided with an annular flange 17. The radial depth of annular wall 16 at its upper end is indicated by line 18 (Fig. 1) and at its lower end by line 19 (Fig. 1). The inner edge of the wall is indicated at 20. Annular wall 16 at its inner edge 20 has a diameter slightly greater than that of the turbine wheel and forms with wall 11 a downwardly curved annular passage 21 through which gases discharged from the turbine wheel flow into the slip stream.

Flange 17 is fastened to the nozzle box by a cylindrical wall 22 which at one edge has a flange 23 attached to flange 17 by suitable means, such as a weld, and at the other edge a flange 24 fixed to the nozzle box by a ring of bolts 25. Bolts 25 serve also to fasten into place a second or inner cylindrical wall 26 spaced inwardly from wall 22. Walls 22 and 26 surround the turbine wheel and form a guard and trap for it. Wall 22 is made from relatively thick, heavy material so it has considerable strength. Wall 26 is made from somewhat thinner material and has less strength. The two walls are spaced apart sufficient to form an annular space 27 which forms a trap surrounding the wheel. If, during operation, a fragment of a wheel, a bucket for example, or a piece of a shroud band should come loose, it would fly radially outward by centrifugal force, penetrating inner wall 26 and depositing itself in space 27, being stopped by the strong outer wall 22. The piece would then be trapped in space 27 and thus prevented from doing further damage. Wall 26 is spaced from the rim of the bucket wheel a distance such that a sizeable fragment thrown off from the wheel will clear the rim of the wheel before being slowed down by striking wall 26. Preferably wall 26 is spaced from the rim of the wheel a distance equal to at least one-half the length of the buckets. With this arrangement, a fragment thrown off from the wheel will fly quickly out of the path of movement of the rim of the wheel so that it will not be struck by the rotating wheel and damage the wheel.

Extending across annular passage 21 between walls 15 and 16 are a plurality of exhaust gas directing and cooling vanes 28 which, as best shown in Fig. 2, are curved downwardly to turn the exhaust gases issuing from the turbine buckets and direct them into the slip stream. Vanes 28 are attached to walls 15 and 16 preferably by welding. They are hollow and the hollow spaces communicate at one end with air chamber 13 and at the other end with the outer side of wall 16, i. e., directly with the atmosphere.

Connected with cooling air chamber 13 at its upper or upstream side is an inlet pipe or ram 29 which faces in the direction of the slip stream and serves to convey air from the atmosphere to chamber 13. At the lower or downstream side of chamber 13 is a narrow air discharge conduit 30. Also, at their lower or downstream sides, walls 10 and 11 are shaped to provide a narrow elongated slot 31 for discharge of air against the rim of the turbine wheel disk for cooling it.

Vanes 28 and conduits 29 and 30 serve to hold annular wall 16 and walls 11 and 12 in assembled relation, the structure as a whole being supported, at least in part, from the nozzle box by the ring of bolts 25.

In operation, gases issuing from the buckets of the turbine wheel are turned by the upstream portion of wall 16 and by vanes 28 and are directed across the wheel and into the slip stream. This serves to effect a gradual turning of the gases and their smooth even flow into the slip stream. Thus the flow of the exhaust gases into the slip stream interferes to a minimum with the distribution of the slip stream air flowing over the turbo-supercharger installation.

The flighthood comprising walls 10 and 11 serves to prevent exhaust gases coming into direct contact with wheel disk 3 and to prevent any after-burning adjacent to the wheel. Cooling air enters chamber 13 through conduit 29 and flows outwardly through hollow vanes 28 to cool the vanes. Also air flows through slot 31 against the rim of the web to cool it and the buckets. The cooling air also absorbs heat from the wheel through wall 10 and carries it away.

By my invention, I provide in connection with a turbine wheel a trap for catching and retaining any fragments which might be thrown off from the wheel and preferably I utilize the construction in connection with a cooling cap or flighthood.

The specific form of cooling cap or flighthood illustrated is not claimed herein as it forms the subject matter of the application of David R. Shoults, Serial No. 430,881, filed of even date herewith, and assigned to the same assignee as the present invention.

Thus with my invention I have provided an improved construction of high temperature, high speed turbines for aircraft. Broadly, a turbine according to my invention comprises a bucket wheel supported on an overhung shaft, a nozzle box for conducting operating gas to the wheel, and means for receiving and retaining fragments thrown from the turbine wheel to protect apparatus associated therewith without interfering with the supply of operating gases to the wheel. The protecting and trapping means is preferably in the form of an annular channel concentrically spaced from the wheel and having an outer wall of sufficient strength to withstand the impact of fragments thereon and an inner wall which is thin and weak and therefore readily punctured or penetrated by flying fragments thrown tangentially from the wheel. The inner wall is preferably spaced from the bucket wheel a distance of one half of the length of the buckets to define a passage in which fragments leaving the wheel are radially spaced therefrom before they penetrate the inner wall of the channel. Hence, the penetration of the inner wall will cause a minimum damage thereto and will not interfere with the continued operation of the turbine as might be the case were the inner wall closely spaced with the wheel. Continued operation of the turbine is often essential to the safety of the aircraft and persons thereon, for example, where the break of a bucket or a portion of the shroudband occurs during operation at altitudes of the order of 30,000 ft. and the turbine is used for supercharging an aircraft engine or cabin. With my invention the supercharging operation can be continued until the craft reaches a safe operating level when the supercharging may be dispensed with.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

High temperature high speed turbine for aircraft comprising a bearing, a shaft supported on the bearing and having an overhung portion, a bucket wheel secured to the overhung portion, a nozzle box located on one side of the wheel for conducting operating gases thereto, and means for receiving and retaining fragments thrown from the turbine wheel to protect apparatus associated therewith without interfering with the supply of operating gases to the wheel, said means including an annular member supported on the nozzle box and forming a channel concentrically surrounding the wheel, said member having an outer relatively strong wall and an inner relatively thin and weak wall and side walls, the inner wall having an edge portion securely fastened to one of said side walls and another edge portion slightly spaced from the other side wall to ease rupture and penetration of the inner wall by such fragments.

JOSEPH S. ALFORD.